United States Patent
Bitran et al.

(10) Patent No.: US 8,045,447 B2
(45) Date of Patent: Oct. 25, 2011

(54) LOW PEAK-TO-AVERAGE POWER RATIO TRANSMISSION IN FREQUENCY-DIVISION MULTIPLE ACCESS SYSTEMS

(75) Inventors: Yigal Bitran, Tel Aviv (IL); Ariel Yagil, Ramat HaSharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 580 days.

(21) Appl. No.: 12/096,220

(22) PCT Filed: Jan. 4, 2007

(86) PCT No.: PCT/IL2007/000008
§ 371 (c)(1),
(2), (4) Date: Aug. 14, 2008

(87) PCT Pub. No.: WO2007/091235
PCT Pub. Date: Aug. 16, 2007

(65) Prior Publication Data
US 2008/0298316 A1    Dec. 4, 2008

Related U.S. Application Data

(60) Provisional application No. 60/772,101, filed on Feb. 9, 2006.

(51) Int. Cl.
*H04J 11/00* (2006.01)
(52) U.S. Cl. ........ 370/208; 370/204; 370/210; 370/330; 370/341; 370/344; 455/562.1; 375/267; 714/752; 714/780
(58) Field of Classification Search .......... 370/203–210, 370/328, 329, 330, 341, 343, 344; 375/260, 375/267; 455/561, 562.1; 714/752, 780
See application file for complete search history.

(56) References Cited

U.S. PATENT DOCUMENTS

| | | | |
|---|---|---|---|
| 6,169,723 B1* | 1/2001 | Fertner et al. | 370/210 |
| 7,016,651 B1* | 3/2006 | Narasimhan | 455/67.11 |
| 7,072,315 B1* | 7/2006 | Liu et al. | 370/329 |
| 7,133,646 B1 | 11/2006 | Miao | |

(Continued)

OTHER PUBLICATIONS

Klang et al., (editors), in "Identification of Radio-Link Technologies," Deliverable D2.1 of te Wireless World Intiative—New Radio (WINNER), IST_2003-507581, version 1.0, Jul. 16, 2004.

(Continued)

*Primary Examiner* — Christopher Grey
(74) *Attorney, Agent, or Firm* — D. Kligler I.P. Services Ltd.

(57) ABSTRACT

A method for communication includes allocating, in a multiple-access communication system (20) that uses multiple subcarriers, first subcarriers to a first communication terminal for transmitting first data, and second subcarriers to a second communication terminal for transmitting second data. The first communication terminal is assigned to modulate the first data onto at least some of the first subcarriers using a first multi-carrier modulation scheme, to produce a first signal. The second communication terminal is assigned to modulate the second data onto at least some of the second subcarriers using a second multi-carrier modulation scheme, which has a reduced peak-to-average power ratio (PAPR) relative to the first multi-carrier modulation scheme, to produce a second signal. Simultaneous communication is carried out with the first and second communication terminals by simultaneously receiving the first and second signals over the first and second subcarriers.

34 Claims, 6 Drawing Sheets

U.S. PATENT DOCUMENTS

| | | | |
|---|---|---|---|
| 7,363,051 B2 | 4/2008 | Bridgelall | |
| 7,372,896 B2 * | 5/2008 | Bjerke et al. | 375/148 |
| 7,406,296 B2 | 7/2008 | Haartsen et al. | |
| 7,418,035 B1 * | 8/2008 | Clark | 375/233 |
| 7,586,990 B2 * | 9/2009 | Subramanian et al. | 375/260 |
| 7,609,772 B2 * | 10/2009 | Yu et al. | 375/260 |
| 7,684,379 B2 * | 3/2010 | Kim et al. | 370/343 |
| 7,706,248 B2 * | 4/2010 | Sondur et al. | 370/208 |
| 7,720,181 B2 * | 5/2010 | Park et al. | 375/341 |
| 7,912,118 B2 * | 3/2011 | Wang et al. | 375/229 |
| 2002/0136233 A1 | 9/2002 | Chen et al. | |
| 2002/0181509 A1 | 12/2002 | Mody et al. | |
| 2003/0054788 A1 | 3/2003 | Sugar et al. | |
| 2003/0169824 A1 | 9/2003 | Chayat | |
| 2004/0029619 A1 | 2/2004 | Liang et al. | |
| 2004/0162106 A1 | 8/2004 | Monroe et al. | |
| 2005/0020299 A1 | 1/2005 | Malone et al. | |
| 2005/0025093 A1 | 2/2005 | Yun et al. | |
| 2005/0059347 A1 | 3/2005 | Haartsen | |
| 2005/0195786 A1 | 9/2005 | Shpak | |
| 2006/0198476 A1 | 9/2006 | Palaskas et al. | |
| 2006/0221917 A1 | 10/2006 | McRae | |
| 2007/0076649 A1 | 4/2007 | Lin et al. | |
| 2007/0104145 A1 | 5/2007 | Jan | |
| 2007/0110003 A1 | 5/2007 | Tujkovic et al. | |
| 2007/0121751 A1 * | 5/2007 | Li et al. | 375/267 |
| 2007/0124478 A1 | 5/2007 | Abdelhamid et al. | |
| 2007/0140256 A1 | 6/2007 | Yaqub | |
| 2007/0153834 A1 | 7/2007 | Qu et al. | |
| 2007/0183383 A1 | 8/2007 | Bitran et al. | |
| 2007/0184798 A1 | 8/2007 | Bitran et al. | |
| 2007/0184835 A1 | 8/2007 | Bitran et al. | |
| 2007/0275746 A1 | 11/2007 | Bitran | |
| 2008/0025422 A1 | 1/2008 | Bitran et al. | |
| 2009/0040975 A1 * | 2/2009 | Vijayan et al. | 370/329 |

OTHER PUBLICATIONS

David Gesbert, et al., "From Theory to Practice: An Overview of MIMO Space-Time Coded Wireless Systems", IEEE Journal on Selected Areas in Communications, vol. 21, No. 3, Apr. 2003, p. 87-96.

Mobile WiMAX applications often conform to the IEEE 802.16e standard, entitled "Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands". IEEE P 802.16e/D11, Sep. 2005.

http://www.ieee802.org/16.

http://www.wimaxforum.org.

International Application No. PCT/IL2007/000008 Search report dated Sep. 11, 2008.

International Application No. PCT/IL2007/000899 Search report dated Apr. 21, 2008.

U.S. Appl. No. 11/638,266 Official Action dated Apr. 29, 2010.

U.S. Appl. No. 11/638,266 Official Action dated Sep. 8, 2010.

* cited by examiner

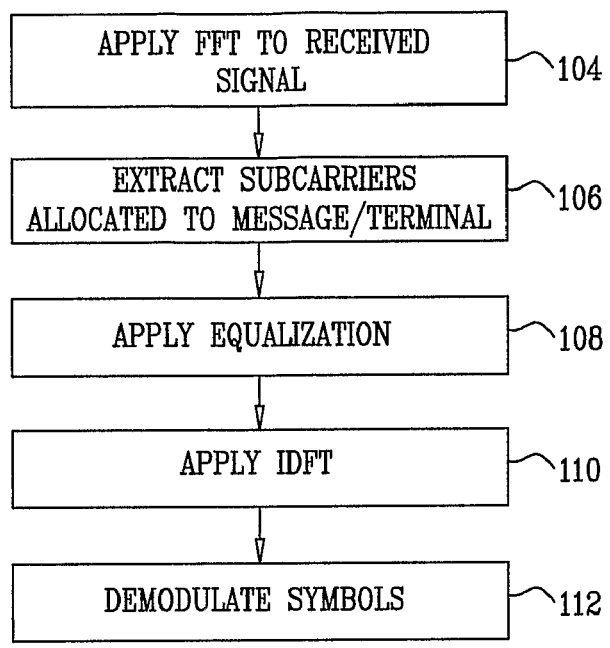
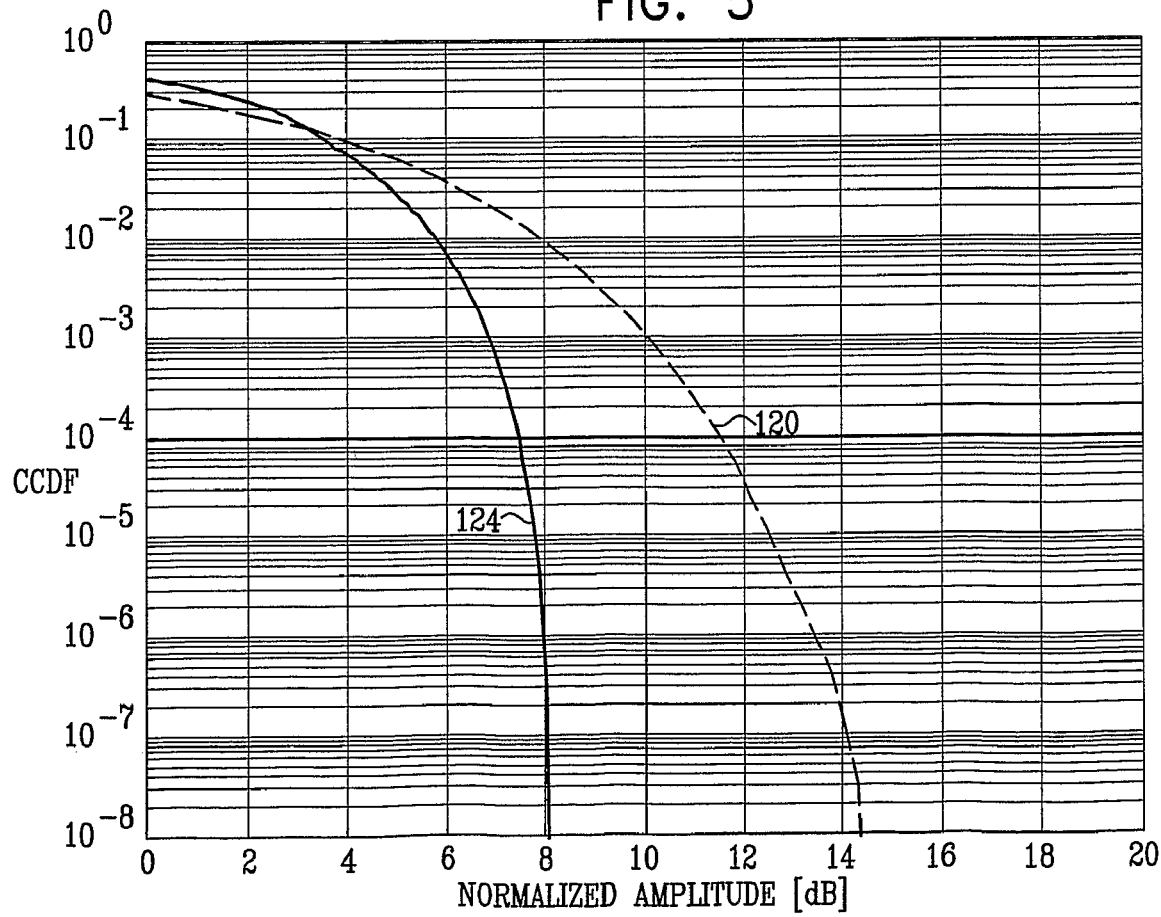

LOW PEAK-TO-AVERAGE POWER RATIO TRANSMISSION IN FREQUENCY-DIVISION MULTIPLE ACCESS SYSTEMS

CROSS REFERENCE TO PRIOR APPLICATIONS

This application is the U.S. national phase of International Application No. PCT/IL2007/000008, filed Jan. 4, 2007, which claims the benefit of U.S. Provisional Patent Application 60/772,101, filed Feb. 9, 2006. The disclosure of both applications is incorporated herein by reference in their entirety. The International Application published in English on Aug. 16, 2007 as WO 2007/091235 under PCT Article 21(2).

FIELD OF THE INVENTION

The present invention relates generally to communication systems, and particularly to methods and systems for transmitting low peak-to-average ratio signals in frequency-division multiple access systems.

BACKGROUND OF THE INVENTION

Several communication systems and applications use frequency division multiple access (FDMA) schemes for allocating frequency resources to multiple communication terminals. One type of FDMA is orthogonal frequency division multiple access (OFDMA), which is used, for example, in communication systems based on the IEEE 802.16 family of standards, commonly referred to as WiMAX. Information regarding these standards is available at www.ieee802.org/16 and at www.wimaxforum.org.

Mobile WiMAX applications often conform to the IEEE 802.16e standard, entitled "Amendment to IEEE Standard for Local and Metropolitan Area Networks—Part 16: Air Interface for Fixed Broadband Wireless Access Systems—Physical and Medium Access Control Layers for Combined Fixed and Mobile Operation in Licensed Bands," which is incorporated herein by reference. Sections 8.4.1, 8.4.2, 8.4.3, 8.4.4, 8.4.6.2, 8.4.6.3 of the standard describe uplink signal generation and transmission.

OFDMA signals comprise multiple subcarriers and, as such, often have large peak-to-average power ratios (PAPR). Some methods and systems have been proposed for transmitting signals having single-carrier characteristics and lower PAPR within the framework of OFDMA. Such methods and systems include, for example, interleaved OFDM, also referred to as I-FDMA and single-channel FDMA (SC-FDMA). These methods and signals are described, for example, by Klang et al. (editors), in "Identification of Radio-Link Technologies," Deliverable D2.1 of the Wireless World Initiative—New Radio (WINNER), IST-2003-507581, version 1.0, Jul. 16, 2004, which is incorporated herein by reference. I-FDMA, also referred to as Frequency Domain Orthogonal Signature Sequences (FDOSS), is described in section 3.2.15, pages 91-92 of this reference. SC-FDMA is described in section 3.2.16, on page 93.

SUMMARY OF THE INVENTION

There is therefore provided, in accordance with an embodiment of the present invention, a method for communication, including:

in a multiple-access communication system that uses multiple subcarriers, allocating first subcarriers to a first communication terminal for transmitting first data, and second subcarriers to a second communication terminal for transmitting second data;

assigning the first communication terminal to modulate the first data onto at least some of the first subcarriers using a first multi-carrier modulation scheme to produce a first signal;

assigning the second communication terminal to modulate the second data onto at least some of the second subcarriers using a second multi-carrier modulation scheme having a reduced peak-to-average power ratio (PAPR) relative to the first multi-carrier modulation scheme to produce a second signal; and communicating simultaneously with the first and second communication terminals by simultaneously receiving the first and second signals over the first and second subcarriers.

In some embodiments, the first signal includes an orthogonal frequency division multiple access (OFDMA) signal. In another embodiment, the first and second communication terminals respectively include first and second subscriber stations (SSs) that communicate with a base station (BS). Communicating with the first and second communication terminals may include operating in at least one uplink mode selected from a group of modes consisting of an Adaptive Modulation and Coding (AMC) mode, a Partially-Used Sub-Channeling (PUSC) mode, a Fully-Used Sub-Channeling (FUSC) and an Optional PUSC mode of an IEEE 802.16e standard.

In yet another embodiment, the second signal includes a frequency-shifted, optionally periodic, waveform occupying a set of equally-spaced subcarriers out of the second subcarriers. The second signal may include a waveform having characteristics of one of a single-carrier signal and a filtered single-carrier signal. Assigning the second communication terminal to modulate the second data may include assigning the second communication terminal to apply a Discrete Fourier transform (DFT) to data symbols selected from the second data, and to modulate outputs of the DFT onto at least some of the second subcarriers.

In some embodiments, allocating the second subcarriers includes allocating multiple interlaced sets of equally-spaced subcarriers out of the second subcarriers to respective multiple communication terminals.

In another embodiment, the second signal includes a known waveform, and communicating with the second communication terminal includes estimating a response of a communication channel to the second communication terminal by receiving and processing the known waveform. The known waveform may include a low-PAPR midamble. In some embodiments, the low-PAPR midamble has a periodic waveform.

In still another embodiment, communicating with the second communication terminal includes causing the second communication terminal to alternate between a first operational mode in which the second communication terminal transmits the second data using the first multi-carrier modulation scheme over at least some of the first subcarriers, and a second operational mode in which the second communication terminal transmits the second data using the second multi-carrier modulation scheme over at least some of the second subcarriers. Causing the second communication terminal to operate in one of the first and second operational modes may include defining a first power threshold value and a second power threshold value higher than the first value, selecting the first operational mode when an output power of the second communication terminal is lower than the first threshold, and selecting the second operational mode when the output power of the second communication terminal is between the first and second threshold values.

In some embodiments, communicating with the second communication terminal includes receiving the second data over multiple different communication channels via multiple antennas, and receiving and processing known waveforms transmitted by the second communication terminal over the respective communication channels so as to estimate responses of the channels.

Receiving the known waveforms may include one of:

receiving the waveforms in parallel over respective non-overlapping subsets of the second subcarriers; and receiving the waveforms at respective different time intervals.

In another embodiment, communicating with the second communication terminal includes receiving the second signal over multiple different communication channels via multiple antennas, and decoding the second data from the second signal using a decision-directed decoding process by:

producing a plurality of soft symbols based on a respective plurality of received and equalized symbols, which are respectively received over at least some of the second subcarriers;

applying a Fourier transform to the soft received symbols;

processing outputs of the Fourier transform to produce hard symbol decisions based on the respective soft received symbols; and applying an inverse Fourier transform to the hard symbol decisions.

There is additionally provided, in accordance with an embodiment of the present invention, a base station in a multiple-access communication system that uses multiple subcarriers, including:

a controller, which is arranged to allocate first subcarriers to a first communication terminal for transmitting first data, and second subcarriers to a second communication terminal for transmitting second data, to assign the first communication terminal to modulate the first data onto at least some of the first subcarriers using a first multi-carrier modulation scheme to produce a first signal, and to assign the second communication terminal to modulate the second data onto at least some of the second subcarriers using a second multi-carrier modulation scheme having a reduced peak-to-average power ratio (PAPR) relative to the first multi-carrier modulation scheme to produce a second signal;

a transmitter, which is arranged to respectively communicate the allocated first and second subcarriers to the first and second communication terminals; and a receiver, which is arranged to communicate simultaneously with the first and second communication terminals by simultaneously receiving the first and second signals over the first and second subcarriers.

There is further provided, in accordance with an embodiment of the present invention, a multiple access communication system that uses multiple subcarriers, including:

a base station, which is arranged to allocate first subcarriers for transmission using a first multi-carrier modulation scheme, to allocate second subcarriers for transmission using a second multi-carrier modulation scheme having a reduced peak-to-average power ratio (PAPR) relative to the first multi-carrier modulation scheme, to respectively communicate the allocated first and second subcarriers to the first and second communication terminals, and to simultaneously receive uplink data respectively transmitted using the first and second multi-carrier modulation schemes over the first and second subcarriers;

a first communication terminal, which is arranged to modulate first data onto at least some of the first subcarriers using the first multi-carrier modulation scheme to produce a first signal, and to transmit the first signal to the base station; and a second communication terminal, which is arranged to modulate second data onto at least some of the second subcarriers using the second multi-carrier modulation scheme to produce a second signal, and to transmit the second signal to the base station.

The present invention will be more fully understood from the following detailed description of the embodiments thereof, taken together with the drawings in which:

BRIEF DESCRIPTION OF THE DRAWINGS

FIG. 4 is a flow chart that schematically illustrates a method for receiving a low-PAPR signal, in accordance with an embodiment of the present invention;

FIG. 5 is a graph showing amplitude distributions of a conventional OFDMA signal and a low-PAPR signal, in accordance with an embodiment of the present invention;

DETAILED DESCRIPTION OF EMBODIMENTS

OVERVIEW

Figure 1:
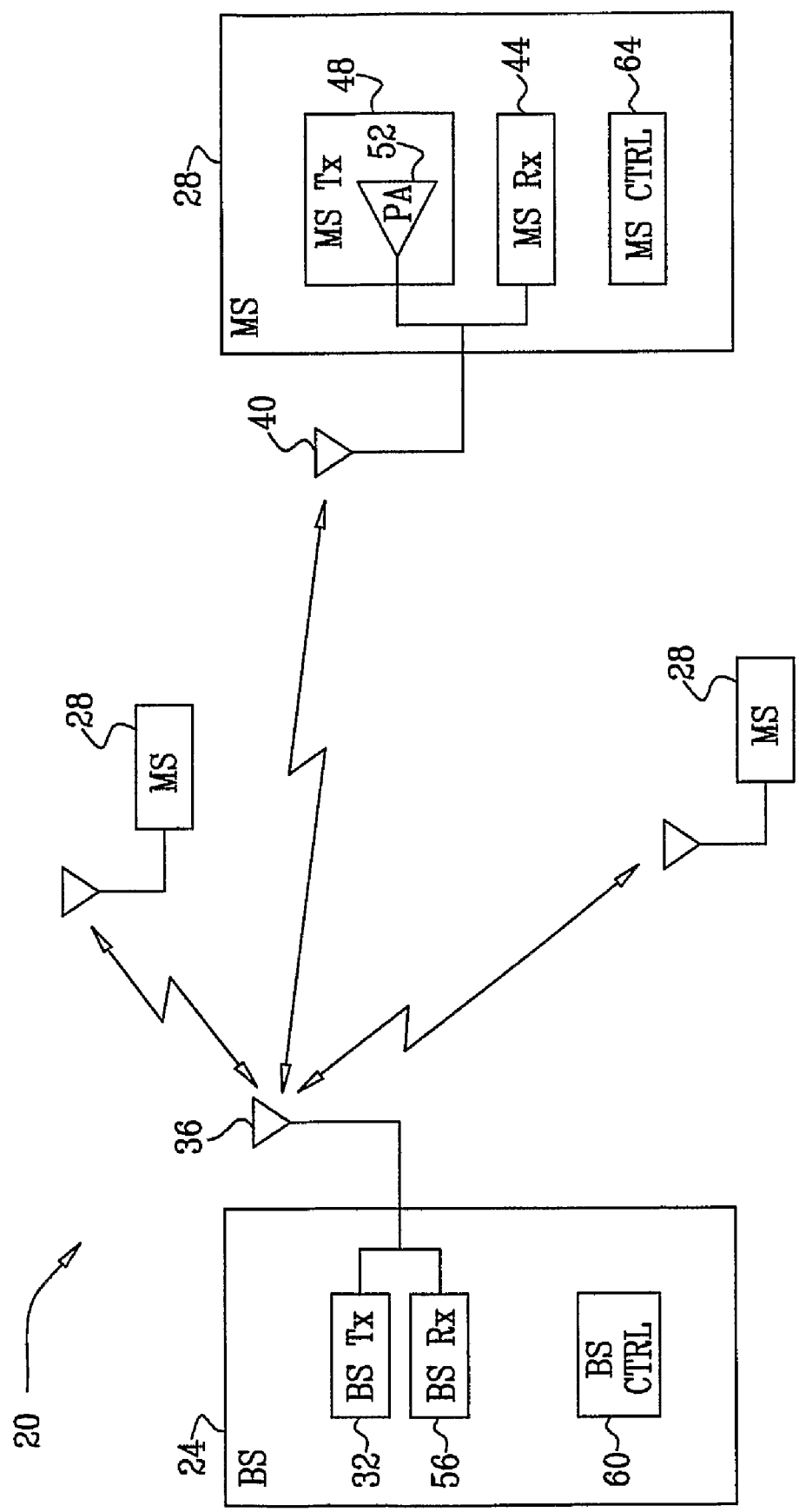
FIG. 1 is a block diagram that schematically illustrates an OFDMA communication system, in accordance with an embodiment of the present invention.

In some FDMA systems, a terminal transmits data to a base station (BS) by transmitting a multi-carrier signal, which comprises multiple subcarriers onto which the data is modulated. The resulting multi-carrier signal usually has a high peak-to-average power ratio (PAPR). For example, in IEEE 802.16e OFDMA systems, the PAPR may reach values in the range of 16-18 dB or more. Since power amplifiers of communication terminals are typically peak power limited, such high PAPR values limit the available transmission power per subcarrier.

Embodiments of the present invention provide improved methods and systems for integrating low-PAPR transmission in FDMA systems, such as IEEE 802.16e OFDMA systems. The low-PAPR signals described herein may comprise periodic waveforms, which occupy sets of equally-spaced subcarriers. The low-PAPR signals have statistical characteristics that resemble a single-carrier signal, and thus have lower PAPR values.

As will be demonstrated below, the PAPR of such signals is often on the order of 4-6 dB lower than the PAPR of comparable OFDMA signals. By using these low-PAPR signals, the available output power per subcarrier is increased accordingly, enabling higher communication range, robustness, system coverage and/or throughput.

The low-PAPR methods and systems described herein are particularly suitable for integration with standard OFDMA systems with only minor modifications. Typically, some of the subcarriers used by the OFDMA system are allocated to communication terminals that use low-PAPR signals, while other subcarriers are allocated to conventional OFDMA terminals. Thus, a base station (BS) can communicate with both types of terminals simultaneously.

Some known low-PAPR methods, such as I-FDMA and SC-FDMA cited above, require that all terminals communicating with a given base station at any given time use either conventional OFDMA or low-PAPR. Unlike these known methods and systems, the methods and systems described herein enable both low-PAPR and conventional OFDMA users to coexist concurrently, during the same symbol intervals. As a result of this concurrency, the time duration allocated to both conventional and low-PAPR transmissions can be extended, and the number of subcarriers allocated to both types of transmissions can be reduced accordingly. The reduced number of subcarriers increases the available power per subcarrier, thus increasing the communication range and throughput.

The low-PAPR signals described herein typically use a set of equally-spaced subcarriers. In some embodiments, multiple low-PAPR terminals can share a block of subcarriers by occupying interleaved sets of equally-spaced subcarriers. Channel estimation is typically performed by transmitting known low-PAPR waveforms, such as midambles, as part of the low-PAPR transmission. In some cases, a particular terminal can switch between low-PAPR and conventional OFDMA operation as desired. An exemplary method for mode selection is described below.

Several exemplary system configurations, resource allocation schemes and signal generation and reception methods are described hereinbelow, mainly referring to uplink transmission in OFDMA systems.

The low-PAPR transmission methods described herein can be deployed in different IEEE 802.16e operational modes. The embodiments described herein mainly refer to operation in the adaptive modulation and coding (AMC) mode, which is also sometimes referred to as adjacent subcarrier permutation. Some aspects of multiple-input multiple-output (MIMO) operation are also described.

System Description

FIG. 1 is a block diagram that schematically illustrates an FDMA communication system 20, in accordance with an embodiment of the present invention. System 20 comprises a base station (BS) 24, which communicates with multiple user terminals, such as mobile stations (MSs) 28. In the present example, system 20 comprises an IEEE 802.16e OFDMA system. Although the exemplary embodiments described below refer to mobile user terminals, the methods and systems described herein can be used with any other type of subscriber station (SS), such as fixed, portable and nomadic subscriber stations.

BS 24 transmits downlink data to each MS 28 over a downlink channel, and each MS 28 transmits uplink data to BS 24 over an uplink channel. In the downlink direction, the BS comprises a BS transmitter (BS TX) 32, which modulates the downlink data to produce a radio frequency (RF) signal and transmits the signal via a BS antenna 36. At the MS, the downlink RF signal is received via a MS antenna 40 by a MS receiver (MS RX) 44. The MS RX demodulates the signal and extracts the downlink data.

In the uplink direction, the uplink data of a particular MS 28 is formatted, encoded, modulated, amplified, filtered and/or otherwise processed by a MS transmitter (MS TX) 48. The MS TX produces an RF signal and transmits it via antenna 40 to BS 24. In particular, MS TX 48 comprises a power amplifier (PA) 52, which amplifies the RF uplink signal to the appropriate output power level.

BS 24 comprises a BS controller 60, which performs different management functions of the BS. Each MS 28 comprises a MS controller 64, which performs different management functions of the MS. Typically, controllers 60 and 64 comprise general-purpose processors, which are programmed in software to carry out the functions described herein. The software may be downloaded to the processors in electronic form, e.g., over a network.

Controllers 60 and 64 may be implemented using software, hardware or a combination of software and hardware elements. The description that follows mainly addresses controller functions that are directly related to the processing of low-PAPR signals. Other functions, which may be performed by the BS and MS controllers, are omitted for clarity.

At least some of the MSs in system 20 transmit uplink data to the BS using low-PAPR signals, as will be explained in detail hereinbelow. Other MSs 28 may transmit their uplink data using known OFDMA signals and methods.

The exemplary system configuration of FIG. 1 is chosen purely for the sake of conceptual clarity. The methods and systems described herein can be used in communication systems and networks having any other suitable configuration. For example, system 20 may comprise multiple base stations interconnected by a suitable core network. Additionally or alternatively, the system may comprise mobile stations, fixed user terminals, or a combination of fixed and mobile stations.

Although the description that follows mainly addresses systems based on the IEEE 802.16e standard cited above, the methods and systems described herein can be used in other systems or applications that allocate frequency resources, such as IEEE 802.20 systems or long term evolution (LTE) systems based on the 3GPP and 3 GPP2 standards.

Elements of system 20, and in particular of BS 24 and MSs 28, which are not essential to the understanding of the present invention, have been omitted from FIG. 1 for the sake of clarity.

Low Peak-to-Average Ratio Signal Transmission

BS 24 allocates the time and frequency resources of the uplink channel to the different MSs, and the MSs transmit their uplink data to the BS using these allocations. Each uplink allocation comprises an allocation of a number of subcarriers, over which the MS modulates its uplink data, for a certain time duration.

Since the composite signal transmitted by the MS comprises multiple subcarriers, it typically has a large peak-to-average power (PAPR) ratio. The PAPR is defined as the ratio between the peak power and the mean power of the signal. The peak power is sometimes specified not as the absolute maximum power, but as a power level that is exceeded only at a certain small probability, e.g., $10^{-6}$, $10^{-4}$, or any other suitable value. The PAPR of the signal typically increases with the number of subcarriers. For a large number of subcarriers, the PAPR may reach 16-18 dB or more. An exemplary amplitude distribution of a multiple-subcarrier signal is shown in FIG. 5 below.

MS TX 48, and in particular PA 52, is designed to provide a certain peak output power. Thus, the PAPR of the uplink signal limits the transmission power of the MS. When the PAPR of the signal is high, the available power per subcarrier is reduced. As a result, the communication range of the MS, the signal to noise ratio at the BS and/or the number of transmitted subcarriers is reduced. Thus, high PAPR often leads to reduced coverage and/or throughput reduction, especially at the edges of the coverage area of the BS.

In order to enable MS 28 to transmit at higher power levels, the MS can transmit its uplink data using low-PAPR signals rather than using conventional OFDMA signals. Although the low-PAPR signal waveforms described herein comprise multiple subcarriers, they have statistical characteristics that resemble a single carrier. As a result, the PAPR of these signals is lower in comparison with conventional OFDMA waveforms. In some embodiments, the low-PAPR signal is periodic. An exemplary method for generating periodic, a low-PAPR waveform is described in FIG. 2 below. Alternatively, any other suitable low-PAPR waveform generated using any other suitable method can also be used.

In some embodiments, the MS can alternate between a low-PAPR transmission mode and a conventional OFDMA transmission mode, based on the MS power level or other criteria. An exemplary method for mode switching is described in FIG. 9 below. Alternatively, MS 28 may transmit exclusively using the low-PAPR mode. At any given time, some MSs may transmit in the low-PAPR mode while other MSs transmit in the conventional OFDMA mode. Methods for allocating uplink resources to MSs that use both transmission modes are described in FIGS. 6-8 below.

Figure 2:
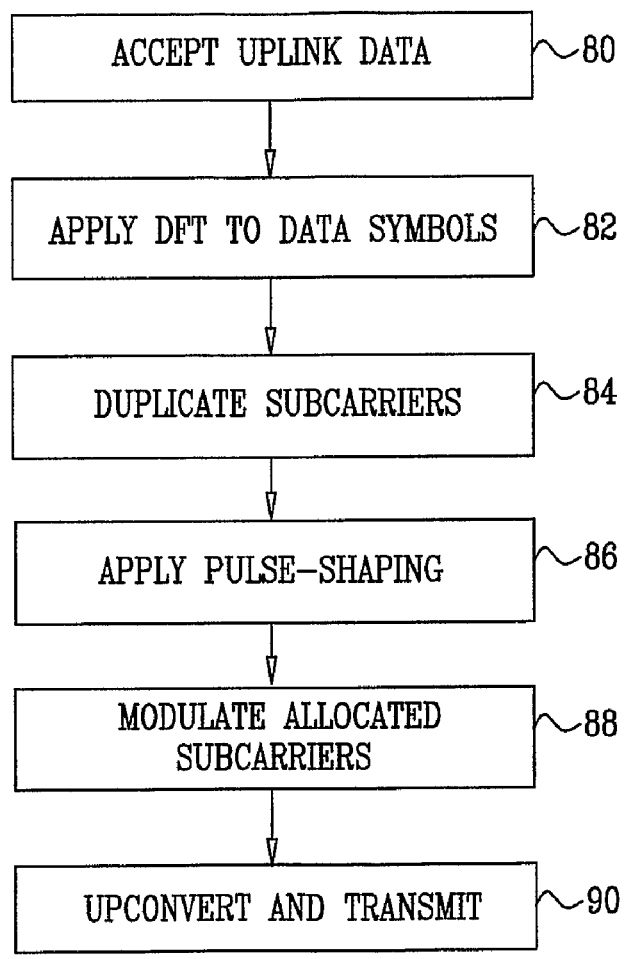
FIG. 2 is a flow chart that schematically illustrates a method for transmitting a low peak-to-average power ratio (PAPR) signal, in accordance with an embodiment of the present invention.

FIG. 2 is a flow chart that schematically illustrates an exemplary method for transmitting a low-PAPR signal, in accordance with an embodiment of the present invention. In the present example, the uplink spectrum allocated to system 20 comprises N equally-spaced subcarriers, numbered with indices 0 . . . N−1. When using the low-PAPR mode, a particular MS is assigned a subset of m subcarriers out of the N subcarriers. The m subcarriers are used to transmit n modulated data symbols (such as quaternary phase-shift keying—QPSK symbols), n≦m. The term m/n−1 is referred to as the roll-off factor.

Figure 3:
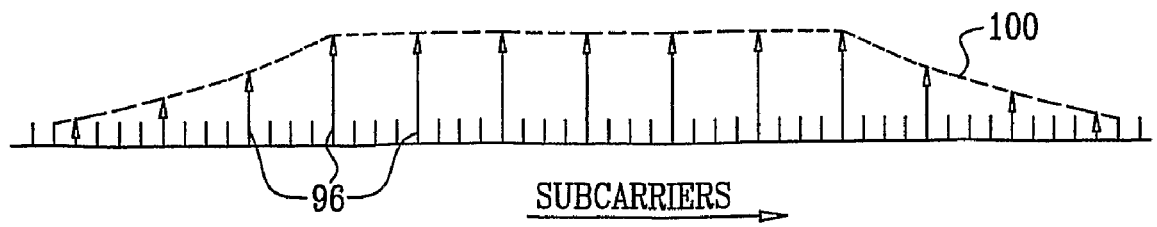
FIG. 3 is a diagram that schematically illustrates a spectrum of a low-PAPR signal, in accordance with an embodiment of the present invention.

The m subcarriers assigned to the MS are equally-spaced, and are spaced k subcarriers apart from one another. The indices of the m subcarriers can be written as $\{m_0, m_0+k, m_0+2 \cdot k, \ldots, m_0+(m-1) \cdot k\}$, wherein $m_0$ denotes the index of the lowest-frequency subcarrier in the subset. When k=1, the m subcarriers are adjacent to one another. An exemplary subset of subcarriers having k=4 is shown in FIG. 3 below. When m=n=N/k, the multi-carrier modulation scheme is referred to as interleaved FDMA (IFDMA).

The method begins with MS 28 accepting uplink data for transmission, at a data input step 80. The uplink data is divided into blocks of n data symbols, with each block transmitted during one OFDMA symbol interval. In some embodiments, the uplink data of a particular MS transmission can be divided into blocks that do not necessarily have the same size. For example, the number of subcarriers allocated to the MS may differ from one OFDMA symbol to another, and the block size may be chosen to match the number of allocated subcarriers.

The number of data bits in each data symbol depends on the modulation scheme used to modulate each subcarrier. For example, when each subcarrier is modulated using QPSK, each data symbol comprises two bits. The description that follows described the processing of a single block. The n symbols are denoted $a_0, \ldots, a_{n-1}$.

MS TX 48 applies an n-point discrete Fourier transform (n-DFT) to the data symbols, at a DFT step 82. The n DFT symbols are given by $$A_i = \frac{1}{\sqrt{n}} \sum_{c=0}^{n-1} a_c \exp\left(-j \frac{2\pi c i}{n}\right), \quad [1]$$
$$i = 0 \ldots n-1.$$

When the roll-off factor is non-zero (i.e., when m>n), MS TX 48 cyclically extends the n-DFT symbols by duplicating the first m-n n-DFT symbols, to produce a total of m symbols, at a subcarrier duplication step 84. The duplicated subcarriers are given by:

$$A_i = A_{i-n}, \quad i=n \ldots m-1. \quad [2]$$

Typically, 10-33% of the subcarriers are duplicated, although any other suitable value can be used.

MS TX 48 then applies spectral shaping to the signal, at a shaping step 86. The MS TX typically multiplies the vector $A_i$, element-by-element, by a shaping vector. The shaping vector may comprise a raised cosine filter, a square root raised cosine (RRC) filter, or any other suitable spectral-shaping pattern. In some embodiments, step 88 is omitted, in which case rectangular spectral shaping is applied implicitly.

The spectral shaping reduces the PAPR of the transmitted signal, in comparison with the PAPR achieved with rectangular shaping. Usually, sharper shaping tends to increase the PAPR of the signal. On the other hand, tapered shaping corresponds to a larger roll-off factor, which decreases the achievable spectral efficiency. In some embodiments, a RRC spectral shaping having a roll-off factor of 0.33 provides a good trade-off between PAPR degradation and spectral efficiency reduction.

MS TX 48 then modulates the data symbols onto the subcarriers allocated to the MS, at a modulation step 88. The composite modulated waveform is given by $$x_t = \frac{1}{\sqrt{N}} \sum_{c=0}^{m-1} A_c \exp\left(j \frac{2\pi F_s t(m_0 + ck)}{N}\right), \quad 0 < t < T_s. \quad [3]$$

$x_t$ denotes the waveform transmitted at time t within the OFDMA symbol interval $[0, T_s)$, wherein $T_S$ denotes the symbol duration. $F_S = \text{delta\_f} \ast N$, wherein delta_f denotes the subcarrier spacing. If a cyclic prefix is used as a guard band, the guard time is included in $T_S$. Note that this modulation operation is similar to conventional OFDMA signal generation, except that the discrete Fourier transforms of the data symbols are applied as $A_i$ instead of the data symbols themselves.

Waveform $x_t$ in equation [3] can be shown to have the characteristics of a single carrier signal, which comprises the original data symbols, filtered by the pulse shaping filter. As such, waveform $x_t$ has a lower PAPR in comparison with a conventional OFDMA signal. Waveform $x_t$ in equation [3] can be shown to be equal to $$X_t = X_{t - \frac{N}{k \cdot F_s}} \cdot \exp\left(\frac{2\pi m_0}{k}\right), \quad [4]$$

$$\frac{N}{k \cdot F_s} < t < T_s$$

It can be seen from equation [4] that waveform $x_t$ is periodic (up to a frequency shift). k periods are contained in the symbol interval $N/F_S$, excluding a possible guard band. The periodicity allows the low-PAPR signal to span a larger bandwidth without occupying a larger number of subcarriers, thus achieving better frequency diversity. Spectrally, signal $x_t$ has the shape of an equally-spaced comb of modulated subcarriers.

The operations performed at steps 80-88 above are typically digital operations. The MS TX now converts the filtered signal to an analog signal (typically after digitally upsampling the signal using interpolation), up-converts the signal to a suitable RF frequency and transmits the signal towards the BS, at a transmission step 90. In particular, the signal is amplified using PA 52.

FIG. 3 is a diagram that schematically illustrates a spectrum of a low-PAPR signal, such as the signal produced by the method of FIG. 2 above, in accordance with an embodiment of the present invention. In the present example, the signal comprises multiple modulated subcarriers 96 with a spacing of four subcarriers, i.e., k=4. The magnitude of the subcarriers at the low and high edges of the band decays in accordance with an envelope 100, as a result of the spectral shaping applied at step 86 of the method of FIG. 2 above.

Note that there are three unallocated subcarriers between every two allocated subcarriers 96. The unallocated subcarriers can be assigned to other MSs, as shown, for example, in FIG. 7 below.

FIG. 4 is a flow chart that schematically illustrates an exemplary method for receiving a low PAPR signal, in accordance with an embodiment of the present invention. The method is carried out by BS RX 56. Generally, the operations performed by the receiver are reciprocal to the operations performed by the transmitter that generated the low-PAPR signal. Front-end functions of the receiver, such as down-conversion and analog-to-digital conversion are omitted for clarity.

The method begins with BS RX 56 applying FFT to the received signal, at a FFT step 104. The receiver then identifies the subset of m subcarriers allocated to the MS in question (i.e., identifies m, $m_0$ and k). The receiver extracts the subset of m subcarriers at an extraction step 106. The receiver then equalizes the signal, in order to compensate for the effects of the channel response and spectral shaping, at an equalization step 108.

The equalized signal comprises n estimates of the n-DFT symbols generated at step 82 of the method of FIG. 2 above. The receiver applies n-point inverse DFT (n-IDFT) to the extracted and equalized subcarriers, at an IDFT step 110, and demodulates the IDFT output to extract the data symbols, at a demodulation step 112. The receiver then reconstructs the uplink data bits from the data symbols and outputs the uplink data.

FIG. 5 is a graph showing amplitude distributions of a conventional OFDMA signal and a low-PAPR ratio signal, in accordance with an embodiment of the present invention. The amplitude distributions shown in the figure were calculated by simulation. The simulated system comprises a 1024-FFT OFDMA system. The MS is allocated sixty-four subcarriers with four subcarrier spacing (i.e., k=4). Data is modulated using QPSK. Spectral shaping is performed using a RRC filter having a roll-off factor of 33%.

The horizontal axis shows the amplitude of the signal, normalized with respect to its mean value. The vertical axis shows probability values. A graph 120 shows an amplitude complementary cumulative distribution function (CCDF) of a conventional OFDMA signal. In other words, the graph shows, for each normalized amplitude, the probability that the signal will exceed this amplitude. For example, it can be seen that the amplitude of the OFDMA signal exceeds 13.5 dB during $10^{-6}$ of the time. A graph 124 shows the amplitude CCDF of a comparable low-PAPR signal.

Comparing graphs 120 and 124 shows that PAPR of the low-PAPR signal is lower than the PAPR of the conventional OFDMA signal by approximately 5 dB at the $10^{-6}$ point and by approximately 4 dB at the $10^{-4}$ point.

Coexistence and Integration with 802.16E Users

The low-PAPR methods and systems described herein are particularly suitable for integration with conventional OFDMA. Some known low-PAPR methods, such as I-FDMA and SC-FDMA cited above, require that all MSs communicating with a particular BS use either conventional OFDMA or low-PAPR in the uplink at any given time. The methods and systems described herein, on the other hand, enable both low-PAPR and conventional OFDMA users to coexist concurrently, during the same symbol intervals.

Figure 6:
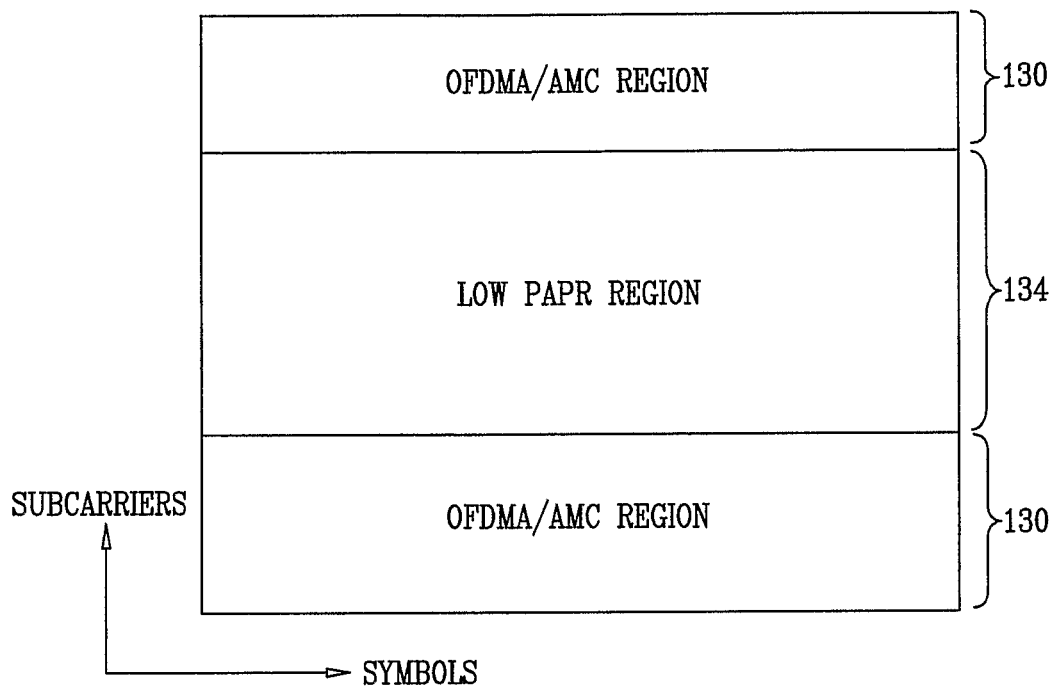
FIGS. 6-8 are diagrams that schematically illustrate distribution of subcarriers among low-PAPR signals and conventional OFDMA signals, in accordance with embodiments of the present invention.

FIG. 6 is a diagram that schematically illustrates coexistence of low PAPR signals and conventional OFDMA signals in an IEEE 802.16e system, in accordance with an embodiment of the present invention. The figure shows a single uplink zone, with the horizontal axis showing OFDMA symbols and the vertical axis showing subcarriers.

In the present example, system 20 operates in the IEEE 802.16e adaptive modulation and coding (AMC) uplink mode (also known as adjacent subcarrier permutation), in which consecutive blocks of subcarriers are allocated to MSs for relatively long periods of time. The methods and systems described herein can be adapted, however, to operate in other IEEE 802.16e permutation modes, such as, for example, the Partially-Used Sub-Channeling (PUSC) mode, the Optional PUSC mode and the Fully-Used Sub-channeling (FUSC) mode. In some embodiments, system 20 can operate in the Adaptive Antenna System (AAS) and Space-Time Coding (STC) IEEE 802.16e modes, in conjunction with the permutation modes mentioned above. Certain aspects of AAS and STC operation are described further below.

The uplink zone is partitioned into an OFDMA region 130, which is allocated to MSs that use conventional IEEE 802.16e OFDMA transmission, and a low-PAPR region 134, which is allocated to MSs that use low-PAPR transmission. In the present example, region 134 comprises a contiguous subset of adjacent subcarriers, and region 130 is divided into two sets of subcarriers. In alternative embodiments, regions 130 and/or 134 may be contiguous or non-contiguous, and may comprise any desired number of subcarriers.

Note that regions 130 and 134 are horizontal. In other words, the BS receives both conventional and low-PAPR transmissions during the same OFDMA symbol interval, with the different modes occupying different subcarriers.

The ability to define horizontal regions across the entire uplink frame enables the BS to increase the number of symbols allocated to each MS. As a result, the number of subcarriers allocated to the MS is reduced. Thus, the MS can transmit a given amount of uplink data over a longer time period using fewer subcarriers. Using a smaller number of subcarriers increases the power per subcarrier that the MS can transmit, thus improving the subcarrier signal to noise ratio (SNR)

at the BS RX. The improved SNR can be used to gain communication range, performance and/or throughput.

Figure 7:
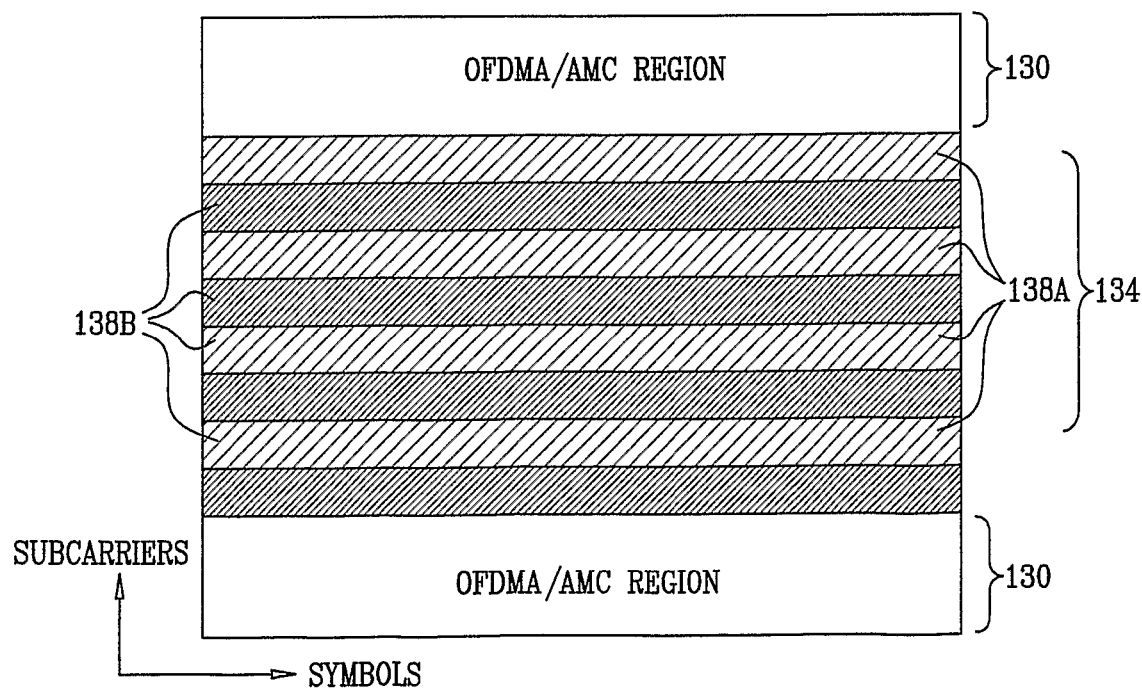

FIG. 7 is a diagram that schematically illustrates coexistence of low PAPR signals and conventional OFDMA signals, in accordance with another embodiment of the present invention. In FIG. 7, low-PAPR region 134 comprises eight subcarriers, which are allocated to two low-PAPR MSs in an interlaced manner. Four subcarriers 138A are allocated to one of the MSs, and four subcarriers 138B are allocated to the other MSs. Each of the two MSs transmits a low-PAPR signal having n=m=4, k=2, i.e., each MS transmits on four subcarriers with an inter-carrier separation of two.

The exemplary subcarrier allocation of FIG. 7 is an exemplary allocation. In alternative embodiments, the subcarriers in the low-PAPR region can be allocated to any desired number of MSs in any desired manner. Typically but not necessarily, region 134 comprises a consecutive set of subcarriers. Within region 134, unique subsets of equally-spaced subcarriers are allocated to different low-PAPR MSs. The equally-spaced sets of subcarriers are interleaved with one another. In region 130, subcarrier allocation can be performed using any suitable method, such as using the methods defined in the IEEE 802.16e standard.

Figure 8:
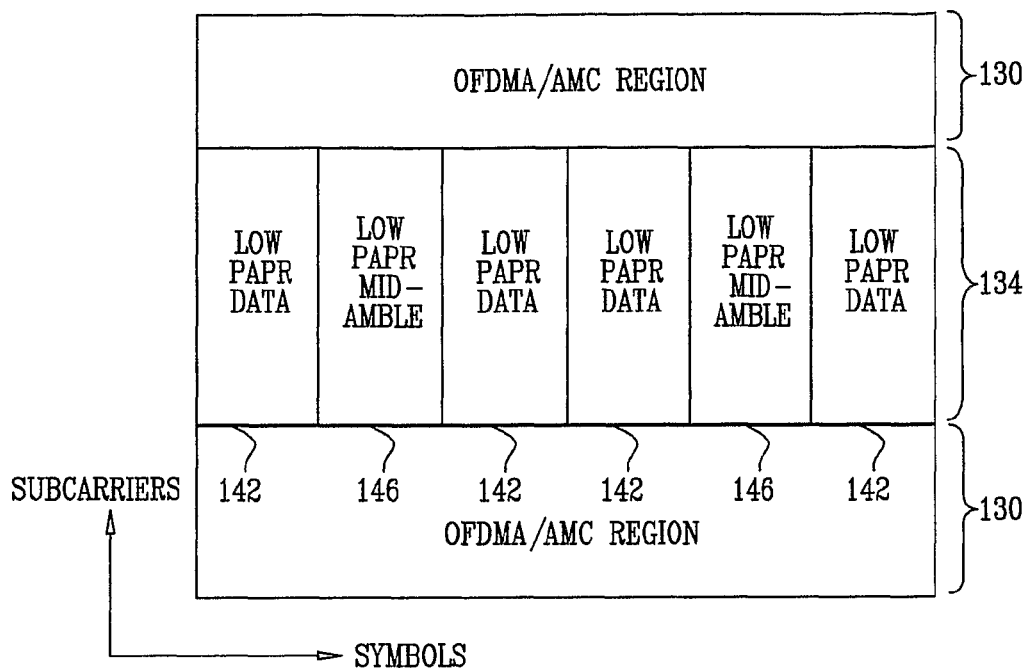

FIG. 8 is a diagram that schematically illustrates coexistence of low PAPR signals and conventional OFDMA signals, in accordance with yet another embodiment of the present invention. In some embodiments, the uplink transmission comprises sections in which the MS transmits known waveforms, such as midambles. The BS uses the midambles to estimate the conditions of the communication channel between the MS and the BS.

In FIG. 8, the low-PAPR region comprises data symbols 142 and midamble symbols 146. In the present example, ⅓ of the symbols comprise midamble symbols, although any other suitable ratio can be used. A high rate of midamble symbols enables reliable channel estimation, particularly for a dynamically changing channel. Typically, the known midamble comprises a low-PAPR waveform similar in characteristics to the signals transmitted during data symbols 142, so as not to degrade the PAPR of the MS.

The midamble can be used in different ways to estimate the channel conditions. For example, the beginning of the midamble can be used to estimate the channel conditions relevant to the data symbol preceding the midamble, and the end of the midamble can be used to estimate the channel conditions relevant to the data symbol immediately following the midamble. Alternatively, the entire midamble can be used to estimate the channel conditions of both the preceding and following data symbols. In some embodiments, the midamble may use only some of the subcarriers of the low-PAPR regions, while the remaining subcarriers can be used to transmit data.

In alternative embodiments, known waveforms can be transmitted in preambles or in any other suitable format.

The parameter values of the low-PAPR transmission, such as the number of subcarriers allocated to a particular MS, the spacing between subcarriers and the response of the pulse-shaping filter can be set to any desired value. For example, the parameter values can be selected so that slots having forty-eight data subcarriers (for two OFDMA symbol intervals) and twenty-four midamble subcarriers (for a single OFDMA symbol interval) are defined. This parameter choice integrates efficiently with the IEEE 802.16e slot structure.

In the IEEE 802.16e AMC mode, uplink resources are allocated in basic units called bins. Each bin comprises nine subcarriers for a duration of one OFDMA symbol. An AMC slot comprises six bins, which may have any desired shape in the subcarrier/symbol plane, i.e., 1×6, 2×3, 3×2 or 6×1 bins. A configuration of 2×3 bins is commonly used. In some embodiments, the dimensions of regions 130 and 134, as well as the selection of subcarrier spacing of the low-PAPR signals, are chosen so as to make efficient use of the available bins, i.e., minimize the number of empty, unallocated slots.

Further additionally or alternatively, the dimensioning of regions 130 and 134 and the choice of low-PAPR parameters may consider the desired frequency diversity. For example, a low-PAPR signal that is spread over a large bandwidth (i.e., has large subcarrier spacing and transmitted in a wideband low-PAPR region) provides increased frequency diversity and immunity to fading. Such increased frequency diversity can be achieved using large subcarrier spacing (large values of k).

Selection of Conventional OFDMA and Low-PAPR Transmission Modes

In some embodiments, a particular MS may support both conventional OFDMA transmission and low-PAPR transmission modes. Such an MS is referred to herein as a dual-mode MS. The MS controller controls the MS TX and sets it to the appropriate mode. Typically but not necessarily, the mode is selected by the BS, and the MS is instructed by the BS to transmit using the selected mode.

Figure 9:
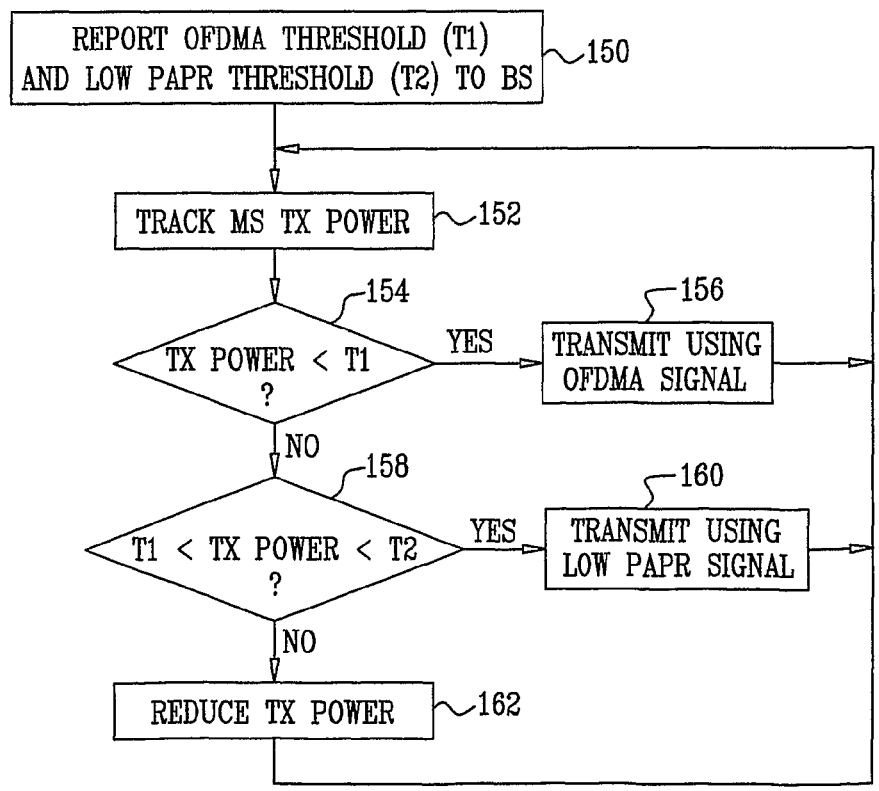
FIG. 9 is a flow chart that schematically illustrates a method for selecting between conventional OFDMA and low-PAPR transmission modes, in accordance with an embodiment of the present invention.

FIG. 9 is a flow chart that schematically illustrates an exemplary method for selecting between conventional OFDMA and low-PAPR transmission modes, in accordance with an embodiment of the present invention. In the present example, each dual-mode MS has two predefined power thresholds. A first threshold, denoted T1, indicates the maximum root-mean-square (RMS) power level at which the MS can transmit in the conventional OFDMA mode. A second threshold, denoted T2, indicates the maximum RMS power level at which the MS can transmit in the low-PAPR mode. Since the maximum power of the MS depends on the PAPR of the transmitted signal, T2>T1. The values of thresholds T1 and T2 may differ from one MS type to another, and also depend on the modulation scheme used. Thus, in some cases the MS holds several sets of threshold values, one set for each modulation type.

The method begins with the MS reporting its threshold values to the BS, at a threshold reporting step 150. Typically but not necessarily, the MS reports its threshold values when it registers with the BS.

The BS tracks the output power level of the MS, at a power level tracking step 152. The BS may calculate the MS power level (per subcarrier) based on the received signal level and the estimated channel attenuation, based on reports from the MS, or using any other suitable method.

The BS checks whether the MS power level is lower than T1, at a first threshold checking step 154. If the MS power level is lower than T1, the BS instructs the MS to transmit its uplink data using the conventional OFDMA mode, at a conventional transmission step 156.

Otherwise, the BS checks whether the MS power level is between T1 and T2, at a second threshold checking step 158. If the MS power level is higher than T1 but still lower than T2, the BS instructs the MS to transmit its uplink data using the low-PAPR mode, at a low-PAPR transmission step 160.

If the MS power level is higher than T2, the BS concludes that it is not possible to allocate resources to the MS based on this power level. The BS thus takes measures that enable reducing the power level of the MS, at a power reduction step 162. For example, the BS may change the modulation and/or coding scheme or reduce the number of carriers allocated to the MS (for example, by fragmenting the messages).

Typically, the BS selects the appropriate transmission mode adaptively before each uplink transmission, based on the current channel conditions and the number of allocated subcarriers. Alternatively, the MS may have a particular default mode selection, or use any other suitable policy.

The decision logic described above implies that the BS prefers to set the MS to the conventional OFDMA mode, and reverts to the low-PAPR mode only when necessary. This logic is preferable in some cases, since the low-PAPR signal is sometimes more sensitive to interference and fading and may have inferior spectral efficiency because of spectral shaping.

Additionally or alternatively, the BS may consider additional factors when selecting the MS transmission mode. For example, the BS may take into account the available resources in the two modes, e.g., revert to the low-PAPR mode if all the resources of the conventional OFDMA mode are already allocated.

Integration of Low-PAPR with MIMO

In some embodiments, system 20 supports communication modes that utilize multiple antennas. Such modes are commonly referred to as multiple-input multiple-output (MIMO). For example, the IEEE 802.16e standard defines MIMO modes called Space-Time Coding (STC). The standard defines two basic STC configurations for the case of two transmit antennas: Tx diversity (such as using the well-known Alamouti code), and spatial multiplexing (SM).

The Tx diversity and SM configurations are defined in the standard using two matrices denoted Matrix A (Tx diversity) and matrix B (SM). Tx diversity STC has a space-time coding rate of 1 and SM STC has space-time coding rate of 2. Similar configurations are defined for systems having three and four transmit antennas. The low-PAPR methods described herein can also be used with certain adaptations when the system operates in the STC configurations.

When using STC Tx diversity (such as using matrix A) in the uplink, each data word is transmitted twice via two transmit antennas, usually in two consecutive data symbols (disregarding midamble symbols). An exemplary STC Tx diversity implementation uses the Alamouti coding scheme. When using the Alamouti code, a first data word S1 is transmitted via a first antenna while a second data word S2 is transmitted via a second antenna during the first symbol. During the second symbol, the complex conjugate of S2 (denoted S2*) is transmitted via the first antenna and −S1* is transmitted via the second antenna. The communication channels between the BS and the two antennas are assumed to remain fixed during the two symbols. The receiver processes the two symbols to extract S1 and S2.

When using low-PAPR transmission in the STC mode, the system estimates the two channel responses by transmitting midambles via the first and second antennas. In some embodiments, the MS TX uses all the subcarriers allocated to the MS to transmit the midamble. When a midamble is transmitted via the first antenna, the second channel is idle, and vice versa.

In an alternative embodiment, the MS TX transmits the two midambles via the two antennas simultaneously dividing the subcarriers between the channels. Some of the subcarriers are used to transmit a midamble via the first antenna, and other subcarriers are used during the same symbol to transmit another midamble via the second antenna. In the latter embodiment, each channel is estimated only at some of the subcarrier frequencies. The channel response at the missing subcarrier frequencies can be estimated by interpolation.

When using SM in the uplink, both the MS and BS use multiple antennas, and the BS RX exploits the diversity provided by the multiple communication channels to increase the link throughput and/or robustness. In order to estimate the responses of these multiple channels, the MS TX transmits midamble symbols via each channel. In some embodiments, the midamble of each channel uses all the subcarriers, and the other channels remain idle during this symbol. Alternatively, the subcarriers can be divided among the midambles of the different channels.

The BS RX can use different types of MIMO decoding schemes for decoding MIMO signals. Some MIMO decoding methods are decision-directed, i.e., use hard symbol decisions as part of the decoding process. Some known decision-directed methods comprise, for example, the vertical bell labs space time (V-BLAST) scheme, the successive interference cancellation (SIC) scheme and sphere decoding. These schemes are described, for example, by Gesbert et al., in "From Theory to Practice: An Overview of MIMO Space-Time Coded Wireless Systems," IEEE Journal on Selected Areas in Communications, (21:3), April 2003, pages 281-302, which is incorporated herein by reference. Typically, each subcarrier is demodulated separately. In particular, hard symbol decisions are generated separately for each subcarrier.

Decision-directed decoders, such as the schemes cited above, should be adapted to operate with the low-PAPR signals generated by the method of FIG. 2 above, since the OFDMA subcarriers are not modulated with data symbols, but with n-DFT symbols (i.e., data symbols transformed by DFT). Symbol decisions (slicing) cannot be obtained by processing only a single n-DFT symbol. Rather, as will be shown below, the decoder is modified to jointly-process all subcarriers in parallel.

Figure 10:
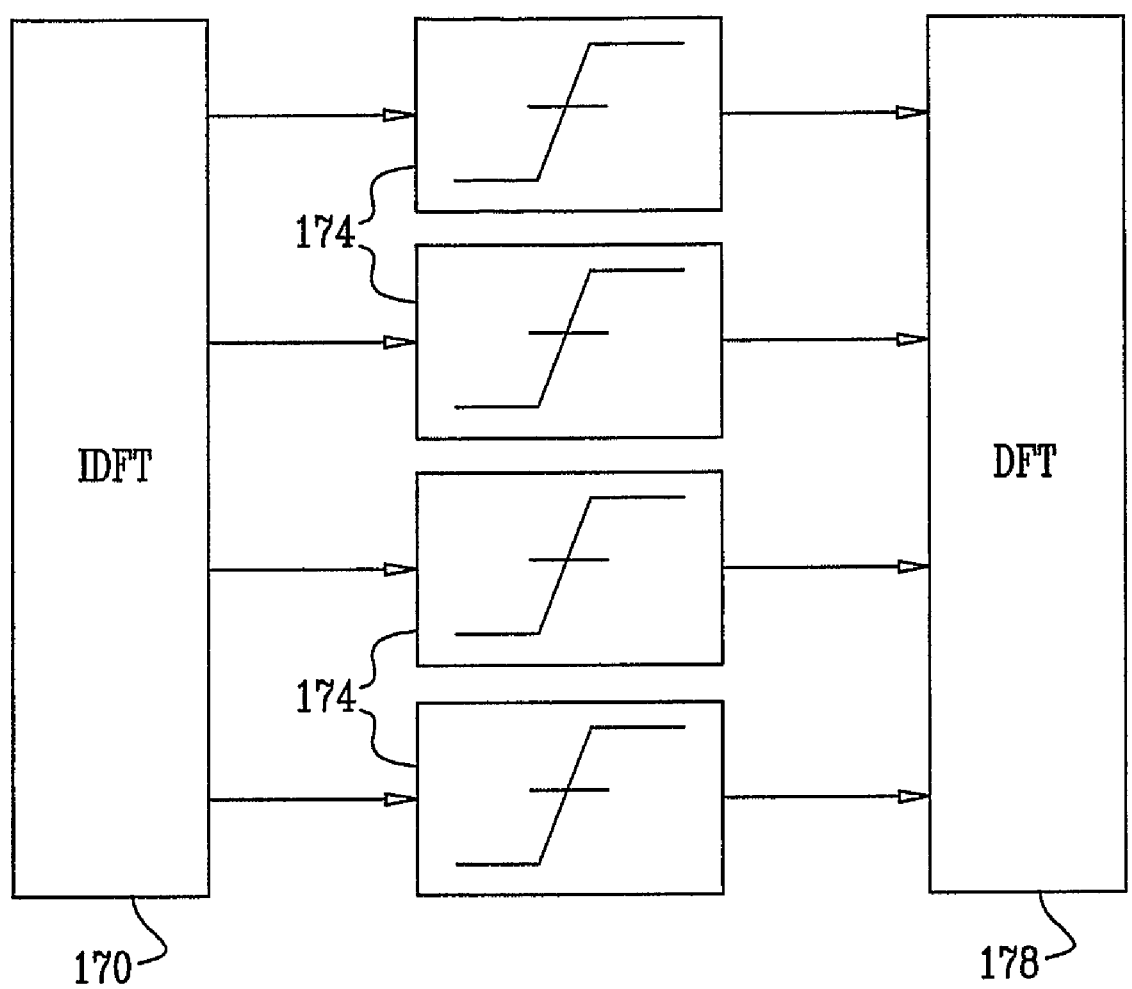
FIG. 10 is a diagram that schematically illustrates a decision-directed decoder for decoding low-PAPR signals, in accordance with an embodiment of the present invention.

FIG. 10 is a diagram that schematically illustrates an exemplary decision-directed decoder for decoding low-PAPR signals, in accordance with an embodiment of the present invention. In the decoder of FIG. 10, all subcarriers are processed in parallel. An IDFT module 170 applies IDFT to a vector of subcarriers produced by the BS RX. Each vector element at the IDFT input comprises a complex in-phase/quadrature (I/Q) signal point that represents the currently-received DFT symbol on a particular subcarrier. Each vector element at the IDFT output comprises a complex I/Q signal point that represents a currently-received data symbol (soft decision).

The soft decision signal points are provided to multiple slicers 174, which produce hard decisions based on the input soft decisions. The slicer structure depends on the type of modulation used to modulate the subcarriers. A vector comprising the hard decision outputs of the slicers is provided to a DFT module 178, which applies IDFT to the vector. The output of the IDFT module is then treated by the decision-directed MIMO decoder as a vector of hard decisions, as if each subcarrier was decoded separately.

Alternatively, the BS RX may use decoding methods that are not decision-directed, without modification.

Although the embodiments described herein mainly address low-PAPR transmission in the uplink of an OFDMA system, the methods and systems described herein can also be used for the downlink of such systems. The principles of the present invention can be used in any other suitable application in which coexistence between low-PAPR and conventional transmission is desired, such as communications over coaxial cables, communications over twisted pairs and communications over optical links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
in a multiple-access communication system that uses multiple subcarriers, allocating first subcarriers to a first communication terminal for transmitting first data, and second subcarriers to a second communication terminal for transmitting second data;
assigning the first communication terminal to modulate the first data onto at least some of the first subcarriers using a first multi-carrier modulation scheme to produce a first signal;
assigning the second communication terminal to modulate the second data onto at least some of the second subcarriers using a second multi-carrier modulation scheme having a reduced peak-to-average power ratio (PAPR) relative to the first multi-carrier modulation scheme to produce a second signal; and
communicating simultaneously with the first and second communication terminals by simultaneously receiving the first and second signals over the first and second subcarriers,
wherein communicating with the second communication terminal comprises receiving the second signal over multiple different communication channels via multiple antennas, and decoding the second data from the second signal using a decision-directed decoding procedure that processes all subcarriers in parallel by;
producing a plurality of soft symbols based on a respective plurality of received and equalized symbols, which are respectively received over at least some of the second subcarriers;
applying a Fourier transform to the soft received symbols;
providing outputs of the Fourier transform to multiple slicers to produce hard symbol decisions based on the respective soft received symbols; and
applying an inverse Fourier transform to the hard symbol decisions.

2. The method according to claim 1, wherein the first signal comprises an orthogonal frequency division multiple access (OFDMA) signal.

3. The method according to claim 1, wherein the first and second communication terminals respectively comprise first and second subscriber stations (SSs) that communicate with a base station (BS).

4. The method according to claim 3, wherein communicating with the first and second communication terminals comprises operating in at least one uplink mode selected from a group of modes consisting of an Adaptive Modulation and Coding (AMC) mode, a Partially-Used Sub-Channeling (PUSC) mode, a Fully-Used Sub-Channeling (FUSC) and an Optional PUSC mode of an IEEE 802.16e standard.

5. The method according to claim 1, wherein the second signal comprises a frequency-shifted periodic waveform occupying a set of equally-spaced subcarriers out of the second subcarriers.

6. The method according to claim 1, wherein the second signal comprises a waveform having characteristics of one of a single-carrier signal and a filtered single-carrier signal.

7. The method according to claim 6, wherein assigning the second communication terminal to modulate the second data comprises assigning the second communication terminal to apply a Discrete Fourier transform (DFT) to data symbols selected from the second data, and to modulate outputs of the DFT onto at least some of the second subcarriers.

8. The method according to claim 1, wherein allocating the second subcarriers comprises allocating multiple interlaced sets of equally-spaced subcarriers out of the second subcarriers to respective multiple communication terminals.

9. The method according to claim 1, wherein the second signal comprises a known waveform, and wherein communicating with the second communication terminal comprises estimating a response of a communication channel to the second communication terminal by receiving and processing the known waveform.

10. The method according to claim 9, wherein the known waveform comprises a low-PAPR midamble.

11. The method according to claim 10, wherein the low-PAPR midamble has a periodic waveform.

12. The method according to claim 1, wherein communicating with the second communication terminal comprises causing the second communication terminal to alternate between a first operational mode in which the second communication terminal transmits the second data using the first multi-carrier modulation scheme over at least some of the first subcarriers, and a second operational mode in which the second communication terminal transmits the second data using the second multi-carrier modulation scheme over at least some of the second subcarriers.

13. The method according to claim 12, wherein causing the second communication terminal to operate in one of the first and second operational modes comprises defining a first power threshold value and a second power threshold value higher than the first value, selecting the first operational mode when an output power of the second communication terminal is lower than the first threshold, and selecting the second operational mode when the output power of the second communication terminal is between the first and second threshold values.

14. The method according to claim 1, wherein communicating with the second communication terminal comprises receiving and processing known waveforms transmitted by the second communication terminal over the respective communication channels so as to estimate responses of the channels.

15. The method according to claim 14, wherein receiving the known waveforms comprises one of:
receiving the waveforms in parallel over respective non-overlapping subsets of the second subcarriers; and
receiving the waveforms at respective different time intervals.

16. The method according to claim 1, wherein the second communication terminal transmits via multiple transmit antennas, and wherein receiving the second signal comprises receiving midamble signals from the multiple transmit antennas of the second communication terminal, and estimating respective responses of the multiple communication channels by processing the received midamble signals.

17. The method according to claim 16, wherein receiving the midamble signals comprises receiving from each transmit antenna of the second communication terminal a respective midamble signal that is transmitted while the other transmit antennas are idle.

18. The method according to claim 16, wherein receiving the midamble signals comprises receiving at least first and second midamble signals, which are transmitted simultaneously via respective different first and second transmit antennas of the second communication terminal on respective different subsets of the second subcarriers.

19. A base station in a multiple-access communication system that uses multiple subcarriers, comprising:
a controller, which is arranged to allocate first subcarriers to a first communication terminal for transmitting first data, and second subcarriers to a second communication terminal for transmitting second data, to assign the first communication terminal to modulate the first data onto at least some of the first subcarriers using a first multi-carrier modulation scheme to produce a first signal, and to assign the second communication terminal to modulate the second data onto at least some of the second subcarriers using a second multi-carrier modulation scheme having a reduced peak-to-average power ratio (PAPR) relative to the first multi-carrier modulation scheme to produce a second signal;
a transmitter, which is arranged to respectively communicate the allocated first and second subcarriers to the first and second communication terminals; and
a receiver, which is arranged to communicate simultaneously with the first and second communication terminals by simultaneously receiving the first and second signals over the first and second subcarriers,
wherein the receiver is arranged to receive the second signal over multiple different communication channels via multiple antennas, and to decode the second data from the second signal using a decision-directed decoding procedure that processes all subcarriers in parallel by;
producing a plurality of soft symbols based on a respective plurality of received and equalized symbols, which are respectively received over at least some of the second subcarriers;
applying a Fourier transform to the soft received symbols;
providing outputs of the Fourier transform to multiple slicers to produce hard symbol decisions based on the respective soft received symbols; and
applying an inverse Fourier transform to the hard symbol decisions.

20. The base station according to claim 19, wherein the first signal comprises an orthogonal frequency division multiple access (OFDMA) signal.

21. The base station according to claim 19, wherein the receiver is arranged to operate in at least one uplink mode selected from a group of modes consisting of an Adaptive Modulation and Coding (AMC) mode, a Partially-Used Sub-Channeling (PUSC) mode, a Fully-Used Sub-Channeling (FUSC) and an Optional PUSC mode of an IEEE 802.16e standard.

22. The base station according to claim 19, wherein the second signal comprises a frequency-shifted periodic waveform occupying a set of equally-spaced subcarriers out of the second subcarriers.

23. The base station according to claim 19, wherein the controller is arranged to allocate multiple interlaced sets of equally-spaced subcarriers out of the second subcarriers to respective multiple communication terminals.

24. The base station according to claim 19, wherein the second signal comprises a known waveform, and wherein the receiver is arranged to estimate a response of a communication channel between the base station and the second communication terminal by receiving and processing the known waveform.

25. The base station according to claim 24, wherein the known waveform comprises a low-PAPR midamble.

26. The base station according to claim 25, wherein the low-PAPR midamble has a periodic waveform.

27. The base station according to claim 19, wherein the controller is arranged to cause the second communication terminal to alternate between a first operational mode in which the second communication terminal transmits the second data using the first multi-carrier modulation scheme over at least some of the first subcarriers, and a second operational mode in which the second communication terminal transmits the second data using the second multi-carrier modulation scheme over at least some of the second subcarriers.

28. The base station according to claim 27, wherein the controller is arranged to accept definitions of a first power threshold value and a second power threshold value higher than the first value, to select the first operational mode when an output power of the second communication terminal is lower than the first threshold, and to select the second operational mode when the output power of the second communication terminal is between the first and second threshold values.

29. The base station according to claim 19, wherein the receiver is arranged to receive and process known waveforms transmitted by the second communication terminal over the respective communication channels so as to estimate responses of the channels.

30. The base station according to claim 29, wherein the receiver is arranged to receive the known waveforms by performing one of:
receiving the waveforms in parallel over respective non-overlapping subsets of the second subcarriers; and
receiving the waveforms at respective different time intervals.

31. The base station according to claim 16, wherein the second communication terminal transmits via multiple transmit antennas, and wherein the receiver is arranged to receive midamble signals from the multiple transmit antennas of the second communication terminal, and to estimate respective responses of the multiple communication channels by processing the received midamble signals.

32. The base station according to claim 31, wherein the receiver is arranged to receive from each transmit antenna of the second communication terminal a respective midamble signal that is transmitted while the other transmit antennas are idle.

33. The base station according to claim 31, wherein the receiver is arranged to receive at least first and second midamble signals, which are transmitted simultaneously via respective different first and second transmit antennas of the second communication terminal on respective different subsets of the second subcarriers.

34. A multiple access communication system that uses multiple subcarriers, comprising:
a base station, which is arranged to allocate first subcarriers for transmission using a first multi-carrier modulation scheme, to allocate second subcarriers for transmission using a second multi-carrier modulation scheme having a reduced peak-to-average power ratio (PAPR) relative to the first multi-carrier modulation scheme, to respectively communicate the allocated first and second subcarriers to the first and second communication terminals, and to simultaneously receive uplink data respectively transmitted using the first and second multi-carrier modulation schemes over the first and second subcarriers;

a first communication terminal, which is arranged to modulate first data onto at least some of the first subcarriers using the first multi-carrier modulation scheme to produce a first signal, and to transmit the first signal to the base station; and a second communication terminal, which is arranged to modulate second data onto at least some of the second subcarriers using the second multi-carrier modulation scheme to produce a second signal, and to transmit the second signal to the base station, wherein the base station is arranged to receive the second signal over multiple different communication channels via multiple antennas, and to decode the second data from the second signal using a decision-directed decoding procedure that processes all subcarriers in parallel by;

producing a plurality of soft symbols based on a respective plurality of received and equalized symbols, which are respectively received over at least some of the second subcarriers;

applying a Fourier transform to the soft received symbols;

providing outputs of the Fourier transform to multiple slicers to produce hard symbol decisions based on the respective soft received symbols; and applying an inverse Fourier transform to the hard symbol decisions.

* * * * *